Patented Aug. 2, 1938

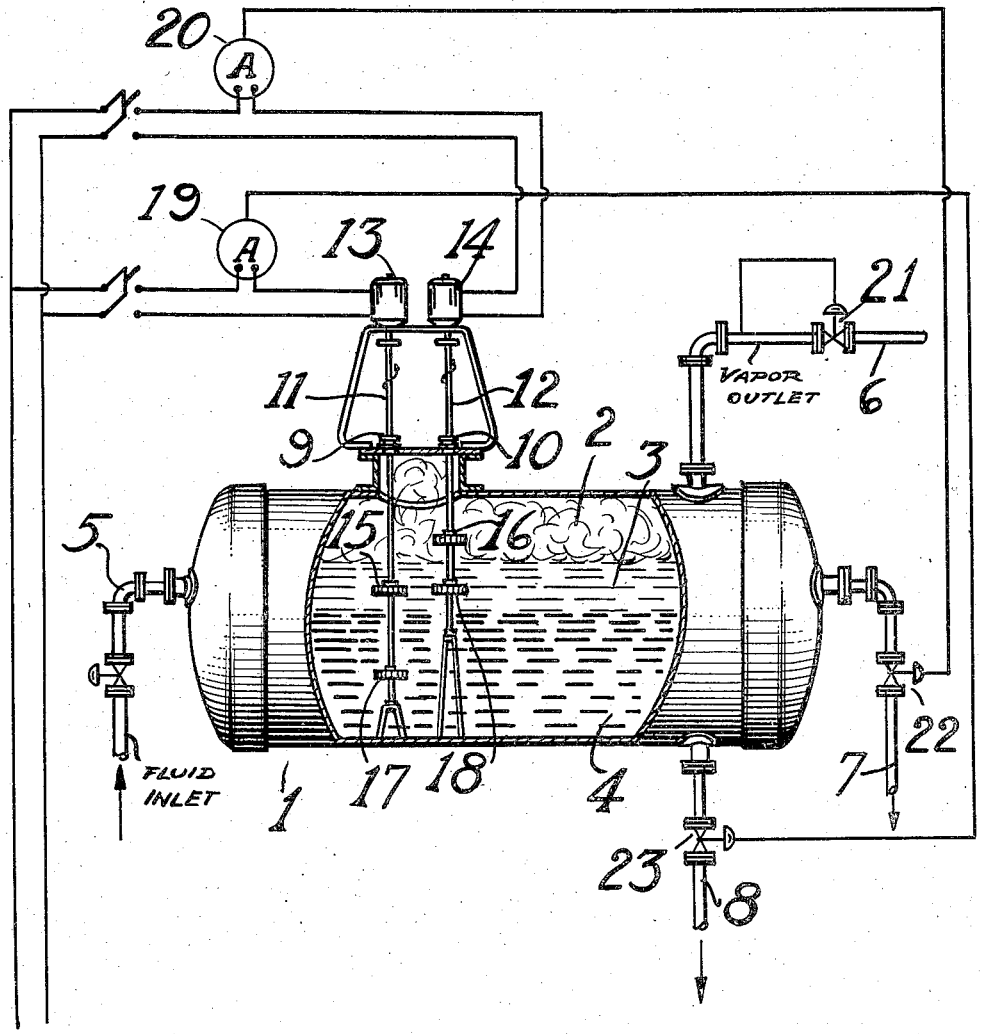

2,125,722

UNITED STATES PATENT OFFICE 2,125,722

LIQUID LEVEL INDICATING AND CONTROLLING DEVICE

Earl M. Hawkins, Roselle, N. J., assignor to Standard Oil Development Company, a corporation of Delaware Application November 21, 1935, Serial No. 50,993

3 Claims. (Cl. 210—51)

The present invention relates to a method and means for determining the respective levels of two or more fluids in a container and especially in a pressure vessel adapted to receive an admixture of fluids of varying densities and viscosities.

The invention may be fully understood from the following description of one application thereof read in conjunction with the accompanying drawing in which numeral 1 denotes a pressure vessel cut away so as to expose the interior thereof. For the purpose of description, the vessel 1 is shown as having an upper zone 2, an intermediate zone 3, and a lower zone 4; zone 2 occupied by a fluid in vapor form and having low density and viscosity, zone 3 occupied by a fluid of greater density and viscosity, in liquid form and zone 4 occupied by a fluid of still greater density and different viscosity, in liquid form. The vessel is provided with a valved inlet line 5, and outlet lines 6, 7 and 8 communicating with the zones 2, 3 and 4 respectively. Openings fitted with packing nuts or glands 9 and 10 are provided in the upper wall of the vessel 1, thru which extend impeller shafts 11 and 12 connected with electric motors 13 and 14. As illustrated shaft 11 passes thru all three zones of the vessel 1 while shaft 12 extends thru only zones 2 and 3. It is within the scope of the invention, however, to provide means for extending the shafts 11 and 12 to any depth desired to provide bearings for them at their lower ends and to otherwise vary the specific arrangement shown by the drawing. It is also within the scope of this invention to provide a single opening in the shell of the vessel fitted with a plane or cover of the proper size thru which the shafts 11 and 12 may enter the vessel. Impellers 15, 16, 17 and 18 are mounted on the shafts 11 and 12 so as to permit adjustment longitudinally of the shafts as may be desired. As shown, impellers 15 and 17 on shaft 11 are mounted so as to be within the zones 3 and 4 respectively, while impellers 16 and 18 are mounted so as to be within zones 2 and 3 respectively.

The electric motors 13 and 14 are connected to a source of energy and also with ammeters or other indicating means 19 and 20 which measure the current consumed by each motor in rotating the impellers on shafts 11 and 12.

Line 6 is provided with a pressure operated valve 21, while lines 7 and 8 are provided with vales 22 and 23 actuated by the indicating means 19 and 20 respectively.

In operation, the motors 13 and 14 are first calibrated to determine their current consumption when the impellers are in a predetermined position and in contact with fluids of the viscosities expected to be handled, a mixture of fluids of various densities and viscosities is then led into the vessel 1 thru the line 5. As the level of the fluids within the vessel rises and separation or stratification takes place the approximate level of each layer may be determined by the consumption of current by the respective motors, due to turning the impellers in fluids of different viscosities. In order to maintain the respective levels substantially constant the valves 22 and 23 are connected to the indicating means 19 and 20 respectively whereby variations in current consumption caused by changes in the respective levels of the liquids in the vessel 1 operate to cause the valves 22 and 23 to be opened or closed as required. Pressure within the vessel is maintained constant by means of the valve 21 in line 6.

This invention is not to be limited by the particular details disclosed for a better understanding thereof but only by the following claims in which it is desired to claim all novelty inherent in the invention as broadly as the prior art permits.

I claim:

1. In a fluid separator having at least three zones of separation, an inlet for a mixture of fluids of different densities and viscosities, outlet lines communicating with the respective zones in the separator, a valve in each line, actuating means for the valves including means for maintaining a substantially constant pressure on said separator, a means for maintaining a predetermined depth of fluid within each zone comprising drive shafts extending into the several zones, a plurality of impellers mounted in series on the drive shafts, each series of impellers disposed within the predetermined limits of two adjoining zones, means for rotating the drive shafts and means operatively connected thereto adapted to measure the energy consumed by each shaft rotating means with reference to a predetermined constant for the fluid and, in response to variations from said constant, to activate said valve actuating means in the outlet lines as required to maintain the predetermined depth of fluid in each zone.

2. Apparatus for separating mixtures of fluids of various densities and viscosities into at least three layers comprising a separator, means for introducing the mixture into the separator where it separates into zones, outlets communicating with the respective zones, means for agitating simultaneously corresponding portions of the fluid in each zone, means for measuring the energy consumed in agitating the fluid in a pair of the zones in conjunction with that for another pair of zones, and means for controlling the discharge of fluid from the zones through the outlets in response to variations from the predetermined constant for energy expended in agitating the fluid therein.

3. Apparatus for separating mixtures of fluids of various densities and viscosities into at least three layers comprising a receptacle, means for introducing such a mixture into the receptacle where it separates into zones, means for maintaining a substantially constant pressure within the receptacle, means agitating simultaneously corresponding portions of the fluid in each zone, means for measuring the energy consumed in agitating the fluid in a set of the zones in conjunction with that for another set of zones, means for discharging fluid from the lower zone of each set in response to variations from a predetermined constant for energy expended in agitating the fluid therein, and means for discharging fluid from the uppermost zone in response to variations from the predetermined constant of pressure within the receptacle.

EARL M. HAWKINS.